Aug. 12, 1952     W. J. LACHMUND     2,606,463
FAUCET DRILL AND FAUCET SEAT REAMER
Filed May 20, 1949     2 SHEETS—SHEET 1
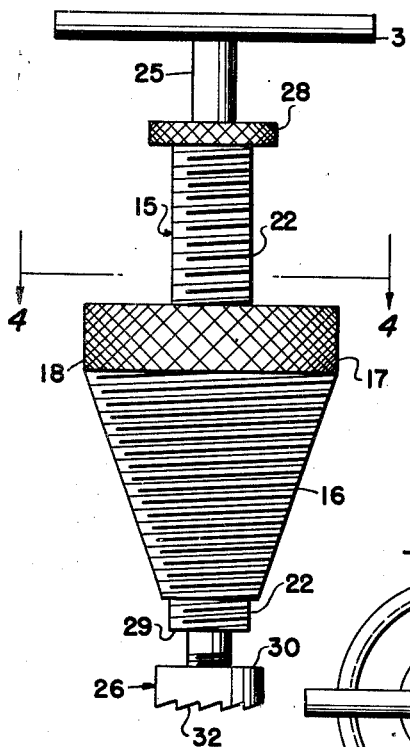
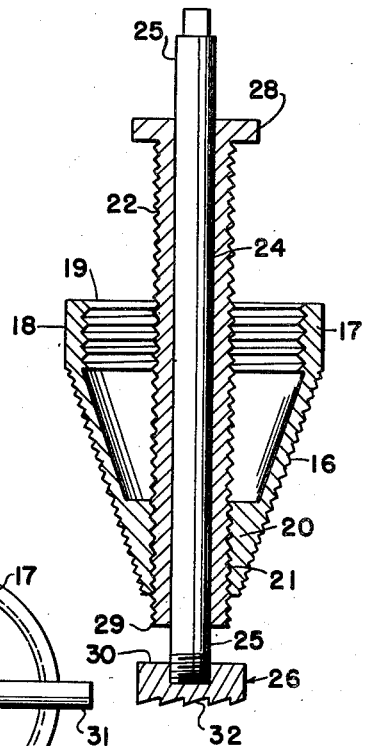
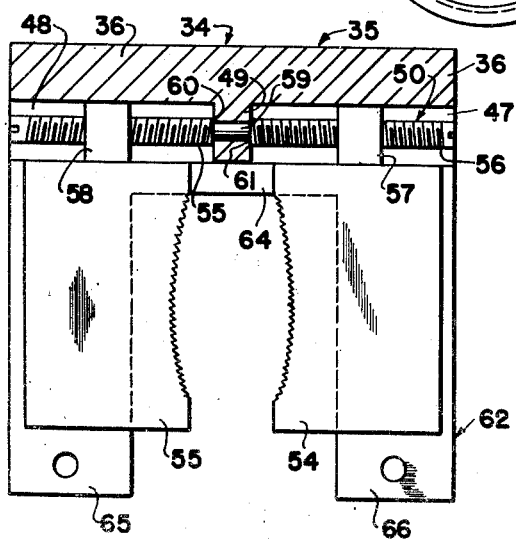
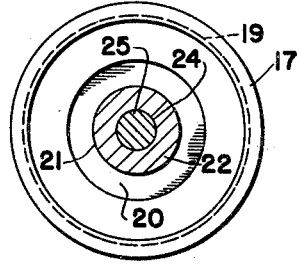
INVENTOR.
WILLIAM J. LACHMUND
BY
McMorrow, Berman & Davidson
ATTORNEYS Aug. 12, 1952 W. J. LACHMUND 2,606,463
FAUCET DRILL AND FAUCET SEAT REAMER
Filed May 20, 1949 2 SHEETS—SHEET 2
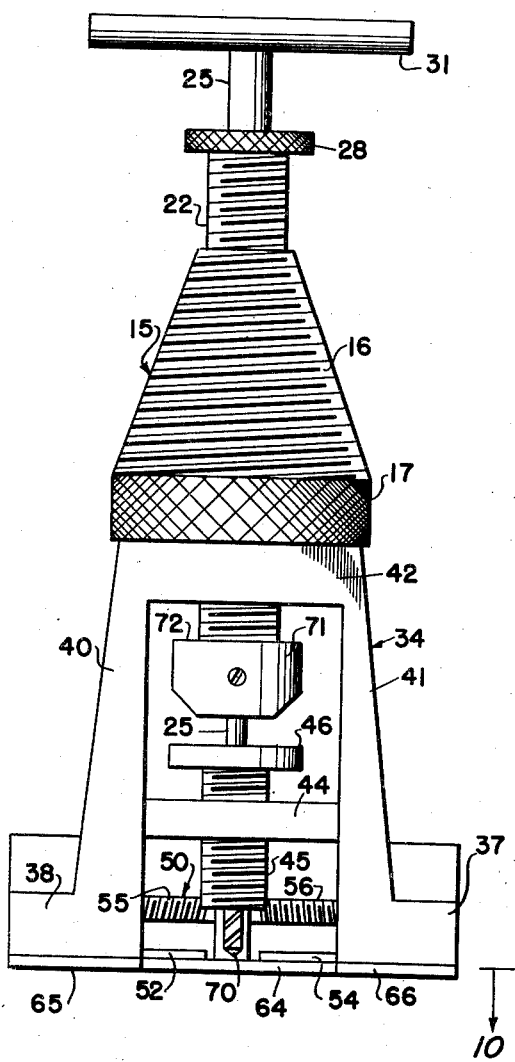
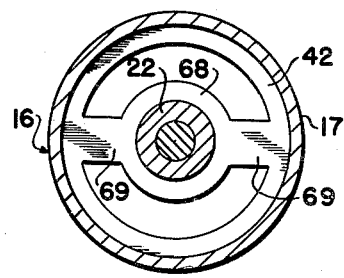
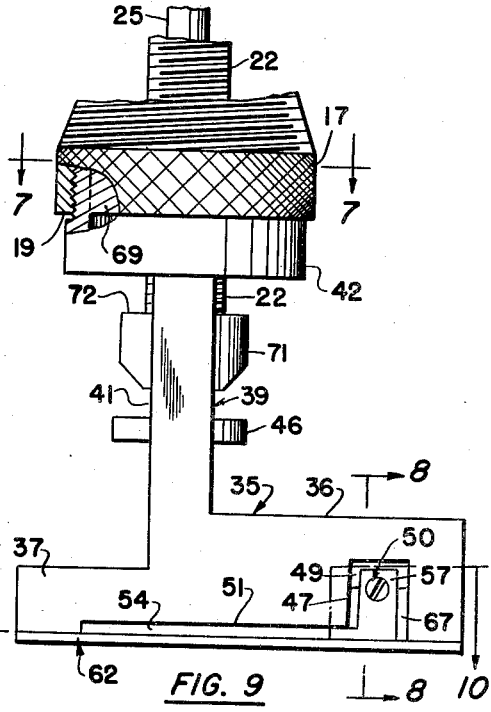
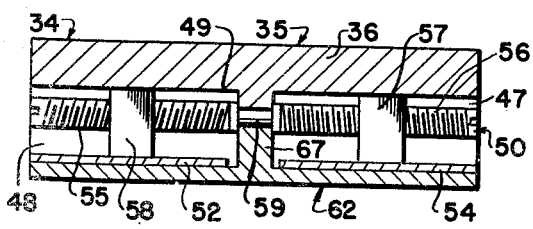
INVENTOR.
WILLIAM J. LACHMUND
BY
McMorrow, Berman + Davidson
ATTORNEYS Patented Aug. 12, 1952

2,606,463

UNITED STATES PATENT OFFICE 2,606,463

FAUCET DRILL AND FAUCET SEAT REAMER

William J. Lachmund, Brooklyn, N. Y.

Application May 20, 1949, Serial No. 94,470

2 Claims. (Cl. 77—18)

This invention relates to a combination drill and reamer for faucet screws and valve seats.

It is an object of this invention to provide a drill and reamer of the kind to be more particularly described hereinafter having means for supporting the drill and reaming tool in the center of the faucet or valve body.

Another object of this invention is to provide a faucet tool of this kind having clamping means for supporting the slidable tool in centered relation to the valve or faucet to be drilled or reamed.

Still another object of this invention is to provide a compact drill or reamer-supporting means of this kind which is formed to be readily applied to fixtures of various sizes, shapes and forms for accurately and efficiently positioning the tool in the exact center of the body of the valve.

A further object of this invention is to provide a tool of this kind having a threadable spindle supported for pressing the drilling or reaming tool into cutting engagement in the center of the faucet screw or valve seat.

With the above and other objects in view, my invention consists in the arrangement, combination and details of construction disclosed in the drawings and specification, and then more particularly pointed out in the appended claims.

In the drawings:

Figure 1 is a side elevation of a faucet-reaming tool constructed according to an embodiment of this invention;

Figure 2 is a transverse section through the reaming tool;

Figure 3 is a top plan view of the tool;

Figure 4 is a transverse section taken on the line 4—4 of Figure 1;

Figure 5 is a side elevation of the combination faucet drill and reaming tool secured on a clamping means for centering the tool for drilling the valve screw or reaming the valve seat;

Figure 6 is a side elevation, partly broken away, of the clamping means for the tool;

Figure 7 is a transverse section taken on the line 7—7 of Figure 6;

Figure 8 is a fragmentary detail section taken on the line 8—8 of Figure 6;

Figure 9 is a fragmentary top plan view of the engagement of one of the clamping jaws with the jaw-actuating screw;

Figure 10 is a transverse section taken on the line 10—10 of Figure 6.

Referring to the drawings, the numeral 15 designates generally a combination faucet drill and faucet seat-reaming tool constructed according to an embodiment of this invention. The reaming tool 15 is formed with a frusto-conical body 16 exteriorly threaded for threadable engagement in the head of a faucet or similar valve. The upper, divergent end of the frusto-conical body 16 is formed with a substantially cylindrical end section 17 which is knurled on the outside, as indicated by the numeral 18, and is interiorly threaded with threads 19 for threadable engagement of the end 17 with the exterior threads on the head of a faucet which ordinarily accommodates a nut for threadable engagement of the bearing or packing gland for the valve screw. The divergent end 20 of the body 16 is formed with an axial center bore 21 threaded internally for threadably receiving an externally screw threaded feed sleeve 22.

The sleeve 22, formed of suitable metal, is exteriorly threaded for threadable engagement in the threaded bore 21, and is formed with a central smooth bore 24 along the length thereof for slidably receiving a tool carrying shaft 25 on which a tool 26 is adapted to be suitably secured. The sleeve 22 has a length substantially greater than the length of the head 16 and cylindrical end 17 and is adapted to be extended beyond the opposite ends of the body 16 when the sleeve is threadably engaged in the bore 21. An annular collar 27 is fixed to, or preferably formed integrally with, the upper end of the sleeve 22 and extends outwardly therefrom. The collar 27 is knurled on the outside, as indicated by the numeral 28, to provide a suitable finger grip for rotating or threading the sleeve in the body 16.

As shown in Figures 1 to 4, inclusive, the knurled head 27 of the sleeve 22 is positioned above the divergent end 17 of the body 16, and the lower end of the sleeve extends beyond the apex of the conical body 16.

The tool 26, in Figures 1 and 2 is a facer for facing valve seats and is threadably engaged on the lower end of the tool-supporting shaft 25 and will conventionally have a diameter substantially greater than the outside diameter of the lower end of the sleeve 22, whereby in operative positions of the sleeve 22 the lower end 29 is adapted to frictionally engage the upper side 30 of the tool 26 for pressing the tool downwardly to cutting engagement with the valve seat or other surface on which the tool is supported for engagement. A transverse handle 31 is engaged on the other end of the tool-supporting shaft 25 to provide for the suitable sliding and rotating of the tool 26.

In the use and operation of the facing tool 15, the lower divergent end of the body 16 is initially threadably engaged in the upper end of the head of a faucet or the like and with the tool-supporting rod or shaft 25 slidably and rotatably engaged in the sleeve 22, the spindle 22 is rotated in the bore 21 for pressing the tool 26 into engagement with the valve seat. With the tool in cutting engagement with the valve seat, the handle 31 may then be rotated and the cutting teeth 32 on the lower side of the tool 26 will cuttingly engage the valve seat to be faced. As the tool-supporting shaft 25 is rotated, the sleeve 27 may be threadably moved downwardly in the body 16 for continually pressing the lower end of the sleeve 22 into pressing engagement with the upper side 30 of the tool 26 for continually pressing the tool 26 downwardly into cutting engagement with the surface to be cut.

In Figures 5 to 10, inclusive, there is shown a supporting member 34 for suitably supporting the tool 15 in a centered relation with the head and valve seat of a valve, not shown in the drawings. The supporting member 34 is formed with a substantially U-shaped base 35 having a fixed bight portion 36 and a pair of forwardly-extending side arms 37 and 38. An inverted U-shaped supporting member 39 is fixed to or formed integrally with the base 35 and extends upwardly therefrom over the space between the side arms 37 and 38. The supporting member 39 includes a pair of side arms 40 and 41 which are fixed to, or preferably formed integrally with, the upper sides of the side arms 38 and 37, respectively, the side arms 40 and 41 being connected together at their upper ends by an annular head member 42.

The head member 42 is formed as a cylindrical open-ended ring threaded on the outside for threadable engagement with the inside threads 19 of the head 17 on the tool-supporting body 16.

A traverse supporting bar 44 is fixed between the side arms 40 and 41 spaced downwardly from the head 42 and above the lower ends of the side arms 40 and 41 and above the side arms 37 and 38 of the base 35. A guide sleeve 45 is threadably engaged through a central aperture or bore in the center of the supporting bar 44, the guide sleeve 45 having a shoulder or flange 46 extending outwardly beyond the threaded side edges thereof at its upper end to provide for the threadable twisting of the spindle 45 during the operation of the tool 15 when supported on the supporting member 34.

The bight portion 36 of the base 35 is formed on the bottom side thereof with an outwardly-opening, cut-out portion or recess 47 opening from one end thereof and a similar cut-out portion or recess 48 opening from the other end thereof. Both the recesses 47 and 48 open through the bottom of the base 35 and a depending bearing member 49 is formed in the center of the bight portion 36 depending from the top wall of the outwardly-extending recesses 47 and 48. A screw member 50 is rotatably supported on the bearing member 49 and is adapted to be rotatably supported in the recesses 47 and 48 on the opposite side of the bearing member 49.

The bight portion 36 and each of the side arms 37 and 38 is formed with a downwardly-opening, shallow recess 51 communicating at the rear end with the recesses 47 and 48 formed in the bight portion 36. A pair of confronting jaw members 52 and 54 are slidably supported in the shallow recesses 51 of the side arms 38 and 39 and the clamping members are adapted to be threadably engaged with the screw elements 55 and 56 on the opposite ends of the screw member 50. A nut member 57 is fixed on the rear edge of one of the jaw members, as the jaw member 54, and is threadably engaged on the screw element 56 on one end of the screw member 50. A nut element 58 is fixed on the rear edge of the other clamping jaw member 55 and is threadably engaged on the screw element 55 on the opposite end of the screw member 50. The screw elements 55 and 56 are oppositely threaded to provide for the movement of the jaw members 54 and 55 together or apart upon rotation of the screw member 50 in one direction. In other words, the screw element 55 is threaded for left-hand rotation, while the other screw element 56 is threaded for right-hand rotation, and the two screw elements 55 and 56 are separated by a center bearing portion 59 which is rotatably engaged on the bearing member 49 of the base 35. The bearing member 59 is of a diameter substantially smaller than the diameter of the screw elements 55 and 56, whereby the ends of the screw elements constitute shoulders 60 and 61 frictionally engaging the opposite sides of the bearing member 49 for holding the screw member 50 against sliding movement transversely of the base 34.

The jaw members 54 and 55 and the screw member 50 are supported in the recesses 51, 47 and 48 in the base 35 by a bottom plate 62 which is secured to the bottom side of the U-shaped base 35.

The bottom closure plate 62 is U-shaped in configuration, the bight portion 64 thereof underlying the bight portion 36 of the base 35 and closing the bottom end of the recesses 47 and 48, the forwardly-extending side arms 65 and 66 engaging below the side arms 38 and 37, respectively, of the base 35. The clamping jaw members 52 and 54 are slidably supported on the arms 65 and 66 of the base plate 62, and a center, upwardly-extending bearing member 67 fixed to or formed integrally with the center of the transverse bight portion 64 engages the lower side of the center bearing 59 of the screw member 50 for suitably supporting the screw member above the base plate 62. The bearing member 67 extends upwardly in confronting relation to the depending bearing member 49 for rotatably supporting the bearing 59 therebetween. The shoulders 60 and 61 of the screw elements 55 and 56 are adapted to frictionally bear against the opposite sides of the bearing member 67, whereby the bearing member will support the screw against transverse sliding movement in the clamping member 34. The base plate 62 is suitably secured to the base member 35 by screws or other suitable removable fastening means, not shown in the drawings.

In the use and operation of the faucet drill and faucet seat reamer, as engaged on the clamping and supporting member 34, with the clamping jaws 52 and 54 suitably supported within the base member 55, the jaw members are initially spaced apart by rotation of the screw member 50 in one direction. The feed sleeve 22 is engaged through the body 16 with the outwardly-extending flange or shoulder 28 positioned above the pointed or convergent end of the body 16, as clearly shown in Figure 5 of the drawings. The cylindrical end 17 of the body 16 is threadably engaged on the head 42, while the lower end of the sleeve 22 is threadably engaged through the apex of the body 16 and downwardly through a nut member 68 supported at the center of the head 42 by the outwardly-extending supporting bars or arms 69, which are fixed to or formed integrally with the head member 42. The drill 70 is suitably supported in a drill chuck 71 carried by the lower end of the tool-supporting shaft 25 and the drill 70 is adapted to be rotatably and slidably engaged through the center aperture of the guide sleeve 46 supported in the supporting member 34. The drill chuck 71 has an outwardly-extending upper edge 72 which extends outwardly beyond the side edges of the feed sleeve 22, so that rotation of the sleeve 22 in the body 16 will provide for the pressing down of the drill 25 into cutting engagement with the work piece clampingly engaged between the confronting faces of the jaw members 52 and 54. The jaw members 52 and 54 are clampingly engaged with the work piece by rotating the screw member 50 for moving the confronting faces of the jaw members clampingly together and thereafter the rotation of the drill 70 will engage the work piece in the exact center. The rotation of the sleeve 22 will press the drill 70 into cutting engagement with the work piece clamped between the jaw members while rotation of the tool-supporting member shaft 25 will effect the cutting of the work member or work piece.

I do not mean to confine myself to the exact details of construction herein disclosed, but claim all variations falling within the purview of the appended claims.

I claim:

1. A drill centering support assembly comprising a base including a first pair of spaced apart arms, a bight portion joining said arms at corresponding ends thereof, a second pair of arms projecting perpendicularly one from each arm of said first pair intermediate the length of said first pair of arms, a circular head joining said second pair of arms at the ends thereof remote from said first pair of arms and having external screw threads thereon, and a bar extending between the arms of said second pair, said bar being fixed to said arms between said head and said first pair of arms and having a tapped hole therein, said bight portion having recesses opening respectively to its opposite ends and separated by an abutment substantially at the midlength location of said bight portion and the arms of said first pair each having a recess therein communicating with the corresponding recess in said bight portion, jaws slidably mounted one in each arm of said first pair of arms and extending into said bight portion, a screw disposed in said bight portion in engagement at its midlength location with said abutment and having oppositely threaded end portions respectively engaging said jaws to move the latter toward and away from each other, a body having an internally threaded bore of larger diameter at one end threaded on said head and having a screw threaded bore of small diameter disposed in alignment with the tapped hole in said bar at the other end thereof, said body being exteriorly tapered between said bores and formed with an external tapered screw thread thereon, a feed sleeve threaded through said last named bore, a guide sleeve threaded through said bar and having a common axis with said feed sleeve, a tool carrying shaft extending through said feed sleeve, a drill chuck on one end of said shaft and disposed between said feed sleeve and said guide sleeve, and a drill secured at one end in said chuck and extending through said guide sleeve, said feed sleeve being movable longitudinally of said body and engageable at one end with said drill chuck to feed said drill, and said guide sleeve being longitudinally adjustable relative to said bar to predetermine the penetration of said drill into a workpiece clamped between said jaws, said body being removable from said head whereupon it may be used as a valve seat reaming tool by providing a suitable tool on said tool carrying shaft.

2. A drill centering support assembly comprising a base including a first pair of spaced apart arms, a bight portion joining said arms at corresponding ends, a second pair of arms projecting perpendicularly one from each arm of said first pair intermediate the length of said first pair of arms, a head adjoining said second pair of arms at their ends remote from said first pair of arms, and a bar extending between the arms of said second pair and fixed thereto between said head and said first pair of arms and having a tapped hole therein, said bight portion having recesses opening respectively to its opposite ends and separated by an abutment and disposed substantially at the midlength location of said bight portion and the arms of said first pair each having a recess therein communicating with the corresponding recess in said bight portion, jaws slidably mounted one in each arm of said first pair of arms and extending into said bight portion, a screw disposed in said bight portion in engagement at its midlength location with said abutment and having oppositely threaded end portions respectively engaging said jaws to move the latter toward and away from each other, a body threaded at one end on said head and having a screw threaded bore disposed in alignment with the tapped hole in said bar, a feed sleeve threaded through said body, a guide sleeve threaded through said bar and having a common axis with said feed sleeve, a tool carrying shaft extending through said feed sleeve, and a tool chuck on one end of said shaft and disposed between said feed sleeve and said guide sleeve, said feed sleeve being movable longitudinally of said body and engageable at one end with said chuck to feed the latter and said guide sleeve being longitudinally adjustable relative to said bar.

WILLIAM J. LACHMUND.

REFERENCES CITED

The following references are of record in the file of this patent:

UNITED STATES PATENTS

| Number | Name | Date |
|---|---|---|
| 372,730 | Wellman | Nov. 8, 1887 |
| 579,037 | Bulock et al. | Mar. 16, 1897 |
| 1,519,952 | Brown | Dec. 16, 1924 |